US00RE34989E

United States Patent [19]

Struhs et al.

[11] E Patent Number: Re. 34,989

[45] Reissued Date of Patent: Jul. 4, 1995

[54] IMAGING ASSEMBLY AND MOUNTING FOR SURVEILLANCE VIEWING UNDER REMOTE CONTROL

[75] Inventors: Kenneth E. Struhs; Mark J. Struhs; Patrick L. Struhs, all of Salt Lake City, Utah

[73] Assignee: British Technology Group USA Inc., Gulph Mills, Pa.

[21] Appl. No.: 742,852

[22] Filed: Aug. 8, 1991

Related U.S. Patent Documents

Reissue of:

[64] Patent No.: 4,855,823
Issued: Aug. 8, 1989
Appl. No.: 190,365
Filed: May 5, 1988

[51] Int. Cl.[6] ..... H04N 7/18

[52] U.S. Cl. ..... 348/151; 348/373

[58] Field of Search ..... 358/108, 229, 87, 225, 358/210; 354/81, 94, 293; H04N 7/18; 348/61, 143, 151, 152, 169, 211, 335, 373

[56] References Cited

U.S. PATENT DOCUMENTS

| | | | |
|---|---|---|---|
| 3,175,037 | 3/1965 | Padgitt | 178/7.85 |
| 3,349,679 | 10/1967 | Lohman, III . | |
| 3,720,147 | 3/1973 | Bemis | 95/86 |
| 3,732,368 | 5/1973 | Mahlab | 178/7.81 |
| 3,739,703 | 6/1973 | Behles | 95/15 |
| 3,819,856 | 6/1974 | Pearl et al. | 178/7.81 |
| 3,916,097 | 10/1975 | Imai | 178/7.2 |
| 3,993,866 | 11/1976 | Pearl et al. | 178/7.81 |
| 4,080,629 | 3/1978 | Hammond et al. | 358/229 |
| 4,120,004 | 10/1978 | Coutta | 358/108 |
| 4,160,999 | 7/1979 | Claggett | 358/108 |
| 4,217,606 | 8/1980 | Nordmann | 358/108 |
| 4,225,881 | 9/1980 | Tovi | 358/108 |
| 4,320,949 | 3/1982 | Pagano | 354/81 |
| 4,326,218 | 4/1982 | Coutta et al. . | |
| 4,594,613 | 6/1986 | Shinbori et al. | 358/213 |
| 4,600,938 | 7/1986 | Sluyter et al. | 358/98 |
| 4,672,219 | 6/1987 | Iwabuchi et al. | 250/578 |
| 4,673,268 | 6/1987 | Wheeler et al. | 352/243 |
| 4,736,218 | 4/1988 | Kutman | 354/81 |
| 4,764,008 | 8/1988 | Wren | 354/81 |
| 4,833,534 | 5/1989 | Paff et al. | 358/108 |
| 4,918,473 | 4/1990 | Blackshear | 354/81 |

FOREIGN PATENT DOCUMENTS

| | | | |
|---|---|---|---|
| 984038 | 2/1976 | Canada | 347/1 |
| 1123646 | 5/1982 | Canada . | |
| 512794 | 10/1971 | Switzerland | G07C 11/00 |
| 1433527 | 4/1973 | United Kingdom | G08B 13/18 |

OTHER PUBLICATIONS

Vicon Industries, Inc., advertisement brochure for "CHROME DOME TM, Observation Without Intimidation," (1973).

Engineered Security Systems, Inc., advertisement for "Mirs Scan: The State of the Art in Closed Circuit Television Surveillance," (Circa Dec. 1980).

Worldwide Communications, Inc., advertisement brochure for "Securityscan Observadome," (1974).

(List continued on next page.)

*Primary Examiner*—Victor R. Kostak

*Attorney, Agent, or Firm*—Workman, Nydegger & Seeley

[57] ABSTRACT

An integrated, miniaturized, imaging assembly, comprising microscope size and arrangement, video camera lenses having the objective lens in a mount that is preferably a blackened sphere and that is pivotally mounted in a supporting structure rearwardly of but adjacent to the objective lens, so the forward end of the lens mount can be placed within a concave dome of unusually small and shallow size with the remainder of the imaging assembly outside of and behind the concavity of such viewing dome, and can be tilted and panned to sweep over a broad viewing area with minimum intrusion thereinto. The imaging assembly includes an electronic image-acquisition device, in line with the optical axis of the lenses, and electronic camera circuitry preferably remote therefrom. An easily movable, tripod type of mount for the imaging assembly is adapted to rest on ceiling or other structure in which the viewing dome is mounted.

85 Claims, 4 Drawing Sheets

OTHER PUBLICATIONS

Pearl Polymatrix, Inc., advertisement brochure for "CHROMEDOME ®," (1987).

Cover letter from David M. Blackshear bearing a date of Feb. 16, 1988, and a sketch transmitted therewith.

Deposition of David M. Blackshear taken Oct. 26, 1992, together with Plaintiff's Exhibits 70–82 identified therein.

Pearl Polymatrix, Inc. "New! Crome Dome," Security World 50 (Oct. 1972).

"Product Reviews, Camera Camouflage, Pearl Polymatrix, Inc.," Security World 41 (Sep. 1972).

"Security Systems Sales Are Soaring," Las Vegas Review Journal 15B (Jul. 29, 1980).

Blackshear, David M., "Deterring Crime is Job for Business, Crime/Fire Committee Chairman Declares," 3 The Decatur–Dekalb News Legal Review 3a (Mar. 18, 1976).

Blackshear, David M., "Formula to Security," reprinted from TRUX, (May 1971).

Blackshear, David M., "T.V. Surveillance 'Why It Works!'", 5 Grocom Grocery Communications 31 (Jan./Feb. 1974).

Blackshear, David M., Supervision: "Who Knows What Evil Lurks in the Heart of Men? The Shadow Do!," TRUX 10, 11, 22 and 27 (Jan./Feb. 1975).

"Bullet Proof Vest in Washable Blue," The Atlanta Journal, p. B9 (Oct. 4, 1972).

"Carriers Say Closed Circuit TV is Eliminating Terminal Thefts," TRUX 12–13 (Feb., 1971).

Greene, Bob, "Latest Gizmos in Protection; Security is a Blanket—A Bomb Blanket," Chicago Sun Times 8 (May 21, 1974).

Impossible Electronic Techniques, Inc., advertisement "Announcing The 'Impossible' LL–15", 10 Security World 106 (Sep. 1973).

"Industry News", CCTV Magazine 14 (Mar./Apr. 1988).

Jefferis, Jonna, "Camera Housings Adapt to Jobs and Locales", 31 Access Control 1 (May 1988).

Moulton, Gwen, "CCTV Systems in Airports Are Keeping the Ground Crews and The Skies Friendly", CCTV Magazine 9 (Mar./Apr. 1988).

Moulton, Gwen, "Financial Institutions Are Banking on CCTV to Deter Fraud", CCTV Magazine 12 (Mar./Apr. 1988).

"New Products", CCTV Magazine 18 (Mar./Apr. 1988).

Pearl Polymatrix, Inc., "Dealer Price Schedule and General Descriptions of Models," (circa Oct. 1, 1977).

Pearl Polymatrix, Inc., "Discreet Surveillance Camera Capsules: Industrial User Price Schedule," (Mar. 20, 1973).

Pearl Polymatrix, Inc., "Discreet Surveillance Camera Capsules Distributors Price Schedule," (Mar. 1, 1973).

Pearl Polymatrix, Inc., "General Specifications for Chrome Dome TM," (1980, 1982).

Pearl Polymatrix, Inc., "Technical Specifications for Slip– Scan TM CCTV Surveillance Tracking System," (1982).

Pearl Polymatrix, Inc., "The Great American Cover–Up" advertising brochure for Weatherdome, Super Sphere, Superdome, Chrome Dome, Staticsphere (1980).

Pearl Polymatrix, Inc., advertising brochure for "Quick Modules, 'Quick Installation Camera Kit'", (Jun. 1, 1982).

Pearl Polymatrix, Inc., advertising brochure for Chrome Dome TM (1973).

Pearl Polymatrix, Inc., advertising brochure for Chrome–Dome TM, "Observation Without Intimidation," (1973).

Pearl Polymatrix, Inc., advertising brochure for "System II Remote Control 360° Scan" (1974).

Pearl Polymatrix, Inc., Dealer Price List for Chrome Dome TM (Mar. 1, 1972).

Pelco Sales, Inc., advertisement for CCTV Housings, 14 Security World 14 (Apr. 1977).

Pelco Sales, Inc., advertisement for Inner–sphere, 15 Security World 16 (May 1978).

Pelso Sales, Inc., advertisement "any way you look at it . . . Pelco's on Top!", 10 Security World 68 (Sep. 1973).

Pelco Sales, Inc., advertising brochure for "Super–Sphere TM Discreet Surveillance Enclosure" (circa 1985).

Polymatrix International, Ltd., "Specifications and Test Procedures for Chrome–Dome ®, Investigative TV Camera Capsules" (1980).

Sanyo, advertisement for CCTV, 10 Security World 6 (Sep. 1973).

Sensormatic Electronics Corp., advertisement brochure for "Saver System, PV-1 Series, Video Surveillance System" (1988).
"Space Age Devices To Outwit Thieves", U.S. News and World Report 75 (Jul. 2, 1973).
Tele-Measurements Inc., advertising brochure "Under the Dome—Security at Playboy's Atlantic City Casino," (Aug. 1981).
Vicon Industries, Inc., "Vicon's Omniscan Housing for Weatherproof Security" advertising and specification brochure for Mark IV OmniScans, Mark III OmniScans, Mark II OmniScan (1986).
Vicon Industries, Inc., advertising brochure and product specification for Mark III OmniScan series (1986).
Vicon Industries, Inc., advertising brochure for "Vicon's Omniscan Housing for Weatherproof Security" (1986-1987).
Jefferis, Jonna, "Camera Housings Adapt to Jobs and Locales," 31 ACCESS CONTROL 1, 22-25 (May 1988).
Telemetrics Incorporated, advertising brochure for "Professional Pan & Tilt Systems" (Dec. 1985).
Vicon Industries, Inc., product specification for "Mark II Omniscan TM Spherical Pan and Tilt Series" (1984).
Vicon Industries Inc., advertising brochure for "Omniscan TM Model V3360PTH Omni-Scan Spherical Pan and Tilt" (1979).
Worldwide Communications, Inc. advertisement for "Securityscan Observadome," (1974).
Videolarm, Inc., "Price Schedule" (Mar. 1, 1981).
Pearl Polymatrix, Inc., "The Great American Cover-Up TM" (1980).
Sensormatic Electronics Corporation, advertising brochure for, "SensorVision ® Outdoor Dome" (Sep. 11, 1986).
Tele-Measurement, Inc., advertising brochure for, "Tele-Dome TM CRS," (Feb. 1987).
Burle Security Products, product advertisement brochure for "Indoor Domed Discreet Housings," (May 1988).
Burle Security Products, product advertisement brochure for "Indoor Quarter-Dome and Half-Dome Discreet Housings" (Models TC9345QD13, TC9345HD26) (May 1988).
Pelco Sales, Inc., advertising brochure for "Discreet Surveillance Enclosures," including Uni-Sphere TM, Inner-Sphere TM, SuperSphere TM, and Enviro-Sphere TM (circa Sep. 1980).
Pelco Sales, Inc., advertising brochure for "Video Surveillance Module Crome Dome ®" (circa Sep. 1976).
Pelco Sales, Inc., advertising brochure for "Video Surveillance Module Crome Dome ®" (circa Feb. 1978).
Pelco Sales, Inc., advertising brochure for "Pelco Inner-Sphere Model IS-2 and IS-3" (circa Sep. 1976).
Pelco Sales, Inc., advertising brochure for "Turbo-Sphere TM Discreet Surveillance Enclosure" (circa Oct. 1984).
Vicon Industries, Inc., advertising page for OMNISCAN Overhead Hidden Pan and Tilt (Model V3600PTH) (1979).
Vicon Industries, Inc., advertising page for OMNISCAN Overhead Vertical Pan and Tilt (Model V3800VPT) (1979).
Vicon Industries, Inc., Instruction Manual for Mark III OMNISCAN Hemispherical Pan and Tilt Drive (Model V3331APTH, V3334FCH and V333D) (1984).
Cohu, Inc., advertisement brochure for "CCTV Cameras and Systems Equipment" (Apr. 1988).
Pelco Sales, Inc., advertising brochure for "Tubo-Sphere TM Discreet Surveillance Enclosure" (Model SB301) (circa Oct. 1984).
Pelco Sales, Inc., "CCTV Accessory Equipment Confidential Dealer Price List," (Jul. 1, 1983).
Sensormatic Electronic Corporation, advertisement brochure for "SensorVision ® CCD Mini Dome" (Feb. 16, 1988).
Sensormatic Electronic Corporation, advertisement brochure for "SensorVision ®" (Jan. 1987).
Fordham Radio 1987 Spring Catalog.

5
65a
63
44
54
55
51
50
61
48
49
57
27
57
56
45
46
56
47
26
47
66
25
53
66
24
15a
26a
15
65a
42
64
38
65a
43
40
66
39
41
32
23a
23
65a
65
31
53
21a
33
28
14
66
14
34
34
12
62
21
14a
16
5

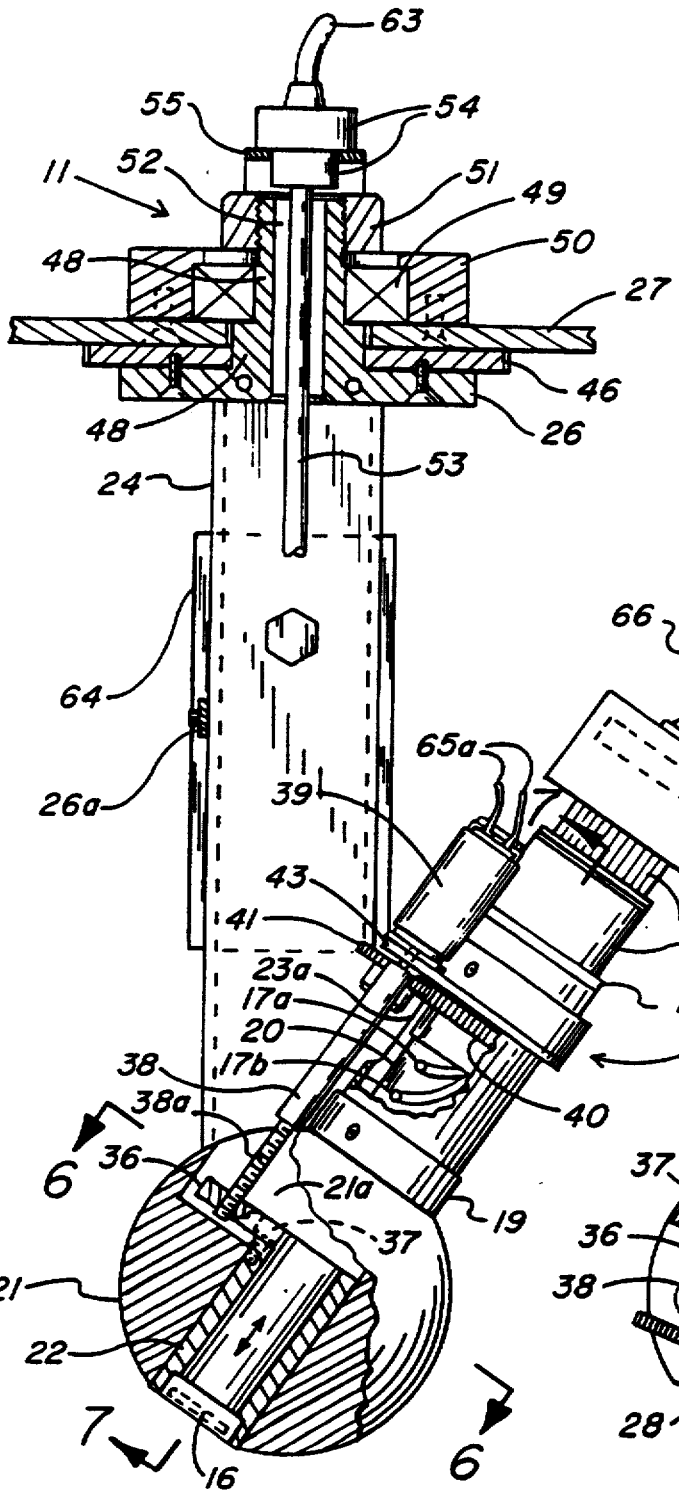
Fig - 5
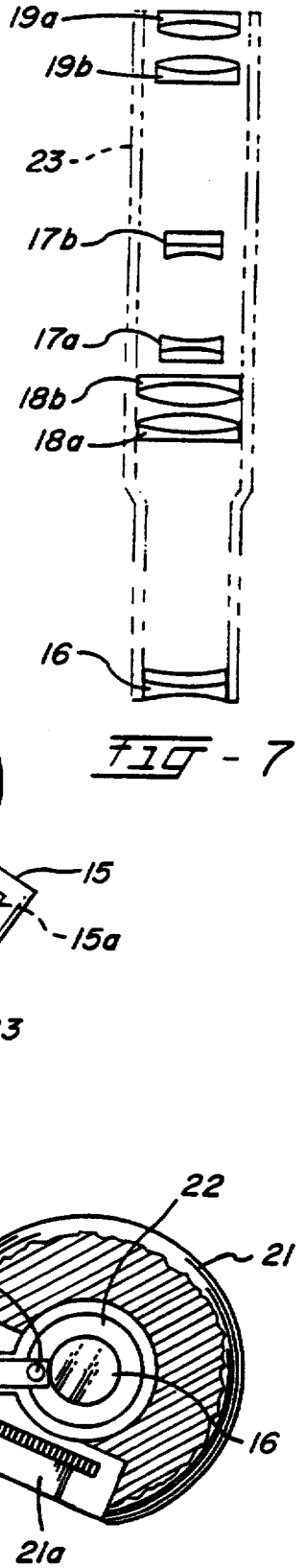
Fig - 7
Fig - 6

IMAGING ASSEMBLY AND MOUNTING FOR SURVEILLANCE VIEWING UNDER REMOTE CONTROL

Matter enclosed in heavy brackets [ ] appears in the original patent but forms no part of this reissue specification; matter printed in italics indicates the additions made by reissue.

BACKGROUND

1. The Field of the Invention

The invention is in the field of remotely and robotically controlled television cameras, including lens systems and mountings therefor, especially as adapted for covert, surveillance purposes.

2. State of the Art

Motorized surveillance television cameras, including those utilizing electronic imaging devices, usually hang into the dome of a dome fixture from a mounting in a ceiling of an area to be watched. However, these cameras and their mountings are very heavy and require special supporting structure other than the ceiling itself. Moreover, they require that the viewing domes of these fixtures be of larger diameter (typically twelve inches or larger) to provide adequate viewing of areas to be watched. These domes protrude deeply into the areas to be watched and are conspicuous and unsightly.

SUMMARY OF THE INVENTION

A principal purpose of the making of the invention was to provide a fully integrated, robotic imaging assembly and mounting therefor for positioning behind a small and inconspicuous viewing dome, with the objective lens of an optical lens arrangement projecting into the dome and mounted for wide sweep tilting and panning viewing movement to such dome, which is of minimum width (typically five inches in diameter or less) and depth (typically one and three-quarters inches or less) that minimizes protrusion into the viewing area.

A feature of the invention is accomplishing this purpose is the positioning of the objective lens of the optical lens arrangement in a mount therefor and the pivoting of such mount, for tilting and panning movement, rearwardly of but adjacent to the objective lens in mounting means that supports the imaging assembly.

Another purpose was to provide such an assembly and mounting of very light weight (typically ten pounds or less) that can rest on a tile or grill of an accoustical ceiling provided with one or more viewing dome fixtures, and that can easily be moved from one dome fixture to another.

Features of the invention for the accomplishment of this purpose are the incorporation, into the imaging assembly, of a miniature optical lens system heretofore designed in general for and utilized in a microscope, but not in a video surveillance camera; the use of an electronic, image-acquisition, charge-coupled device optically aligned with the lens arrangement and electrically connected with remotely-positioned, electronic camera circuitry; and a simple, height-adjustable, tripod type of mounting means for the imaging assembly.

A further purpose was to provide simple but effective mechanical mounting means for the objective lens and for the entire imaging assembly, including remotely controlled electric motors, limit switches, and parking brakes for filting and panning movements, whereby any light reflection through the dome fixture would be minimized, if not eliminated altogether, without resorting to the usual practice of placing double domes in the dome fixture.

Features of the invention for the accomplishment of this purpose are the employing of a spherical mount for the objective lens, blackening the spherical surface of such mount, and the pivoting of the spherical mount between a pair of arms depending from a turntable in a platform constituting part of the mounting means for the imaging assembly.

THE DRAWINGS

The best mode of carrying out the invention in actual practice is illustrated in the accompanying drawings, in which:

FIG. 1 represents a pictorial view of an integrated imaging assembly supported in accordance with the invention for remotely controlled, surveillance purposes above the ceiling of an area to be watched through a relatively small and inconspicuous dome fixture in such ceiling, the ceiling and dome fixture being shown in vertical section and the integrated imaging assembly being shown at one end of the wide angle scanning positions through which it is adapted to sweep;

FIG. 2, a top plan view of the embodiment of FIG. 1;

FIG. 3, a schematic representation of the surveillance viewing area covered by the sweep of the imaging assembly of the invention;

FIG. 4, a vertical section taken on the line 4—4 of FIG. 2, viewed apart from the ceiling and dome fixture;

FIG. 5, a vertical axial section taken on the line 5—5 of FIG. 4;

FIG. 6, a horizontal section taken on the line 5—5 of FIG. 4; and

FIG. 7, a vertical section taken on the line 7—7 of FIG. 5, the barrel and lenses of the lens system being indicated schematically and in non-zoom positions.

DETAILED DESCRIPTION OF THE ILLUSTRATED EMBODIMENT

It should be realized that many different structural arrangements can be utilized in carrying out one or more of the several purposes and objectives of the invention within the generic purview of the several enumerated above, as will be apparent to those skilled in the art seeking to take advantage of the teachings herein. However, the illustrated embodiment described in detail hereinafter represents the best mode presently contemplated for taking full advantage of all aspects of the invention.

Figure 3:
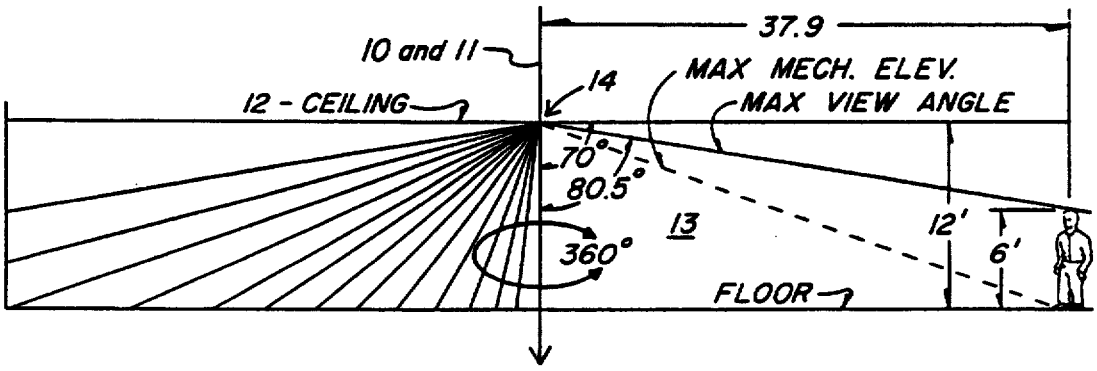

Thus, in the form illustrated, the invention comprises a fully integrated, electronic, imaging assembly, indicated generally 10, supported by mounting structure, indicated generally 11, placed on the ceiling 12 (shown somewhat schematically) of an area 13, see particularly FIG. 3, such as a merchandise display and sales area, to be watched by combining panning and tilting movement of such imaging assembly 10 for possible shop-lifting or other improper activities.

The imaging assembly 10 is miniaturized, so as to be unusually small and lightweight and supportable by readily portable mounting structure resting directly on typical ceiling structure such as a tile or grill of an accoustical ceiling, and so as to accomplish its surveillance function through the concave dome 14a of an unusually small dome fixture 14 in ceiling 12.

As shown, imaging assembly 10 includes a high resolution, light sensitive, charge-coupled, electronic image-acquisition device 15a, that is protectively mounted along with customary electronic circuitry in a box 15. Such device 15a is readily obtainable on the open market as a printed circuit chip, e.g. produced in Japan by Fujitsu, Sony, or Hitachi, and produced in the U.S. by R.C.A. or Texas Instruments.

Imaging assembly 10 also includes an arrangement of lenses, FIGS. 5 and 7, unique to video surveillance cameras but used heretofore in microscopes, which provides for desired miniaturization of the assembly. This lens arrangement as here employed comprises as uniquely-mounted objective, i.e., focusing, lens 16 that is small with minimal tell-tale light reflectivity, and a pair of zoom lenses 17a and 17b between fixed lenses 18a and 18b and 19a and 19b. The zoom lenses are conventionally mounted, as shown generally at 20, with camming pins and guide slots for back and forth relative movement away from and toward each other, respectively, as they are moved simultaneously forwardly or backwardly. A standard video surveillance camera has an objective lens that is at least one and a half inches in diameter, while the microscope lens system of the present invention is about one-half that size or less.

In accordance with one aspect of the invention, objective lens 16 is positioned in a spherical mount 21 in a slidable tube 22 for focusing movement back and forth along an axis of the sphere within a passage of the spherical mount coincident with such axis. Spherical mount 21 is rigidly interconnected with box 15 by a barrel housing 23 in which zoom lenses 17a and 17b and fixed lenses 18 and 19 are mounted, so that image-acquisition device 15a is in optical alignment with the lens system. Optical alignment means only that device 15a is positioned to receive images transmitted by the lens system, which may be of any suitable geometric configuration, even to the extent of incorporating one or more mirrors as do some optical configurations known to the art.

So as to be capable of both panning and tilting movement relative to dome 14a of dome fixture 14, with maximum sweep over an area to be watched, imaging assembly 10 has the spherical mount 21 for objective lens 16 pivoted diametrically of the sphere between a pair of arms 24 and 25, respectively, that depends from a turntable 26, FIG. 5, supported by a flatform 27 of mounting structure 11. The arms are held firmly in position relative to each other by a crossbrace 26a.

With the diameter of spherical mount 21 being three inches, imaging assembly 10 can be placed above ceiling 12 so that objective lens 16 extends deeply into the concavity of a five-inch diameter dome, and, with say a one and three-quarter inch maximum depth for such concavity of the dome, such objective lens 16 can sweep over a considerably larger viewing area, see 13 of FIG. 3, than can corresponding video cameras of the prior art mounted relative to much larger viewing domes.

Figure 1:
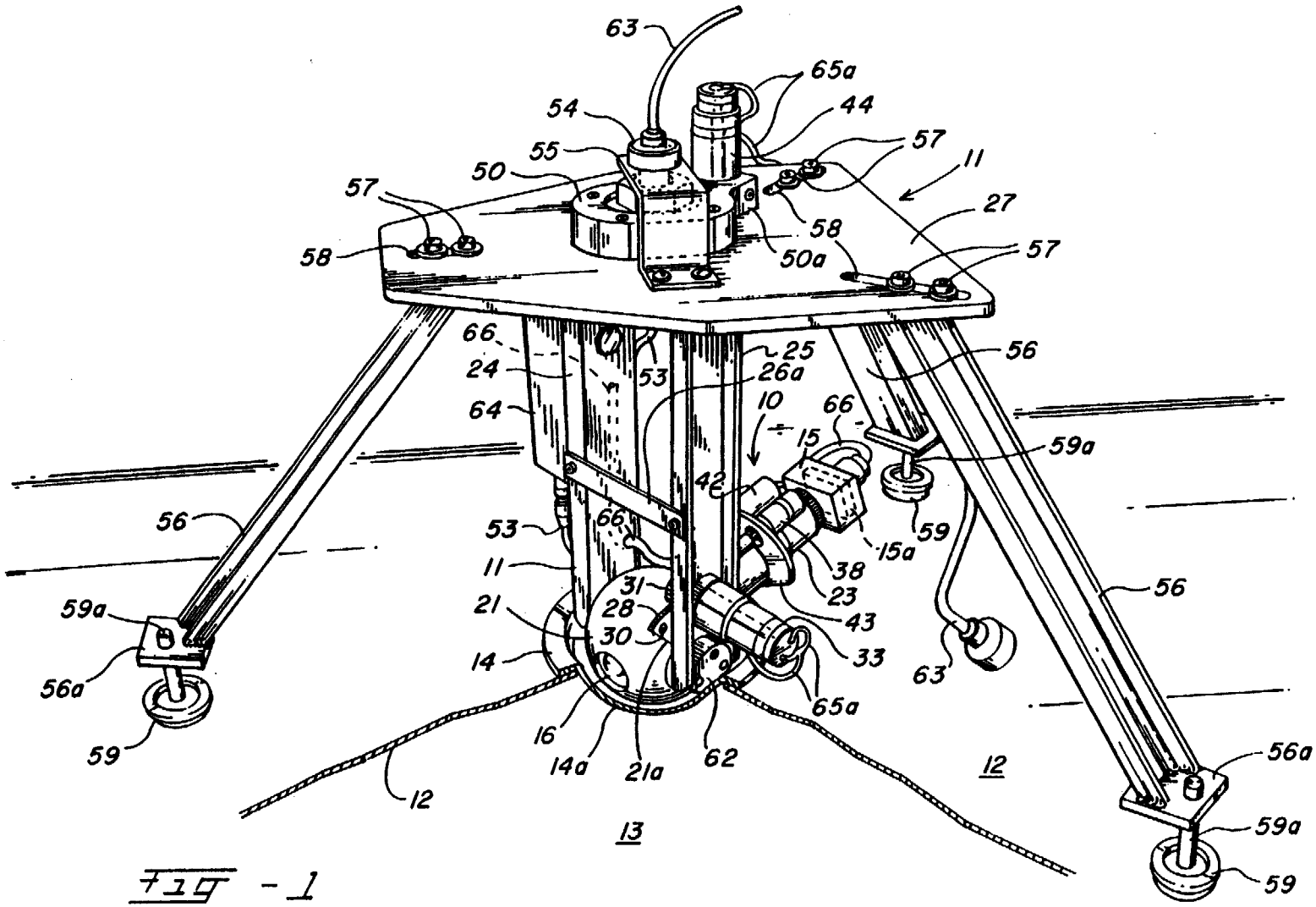
Figure 2:
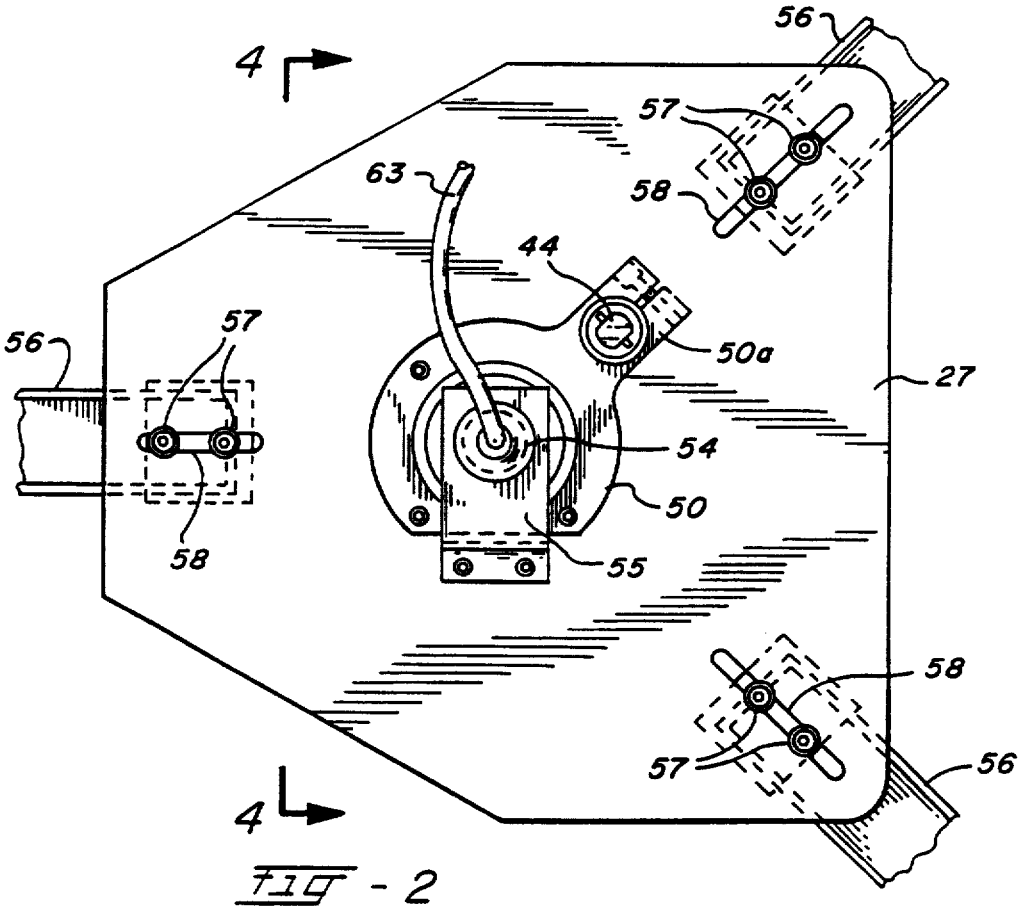
Figure 4:
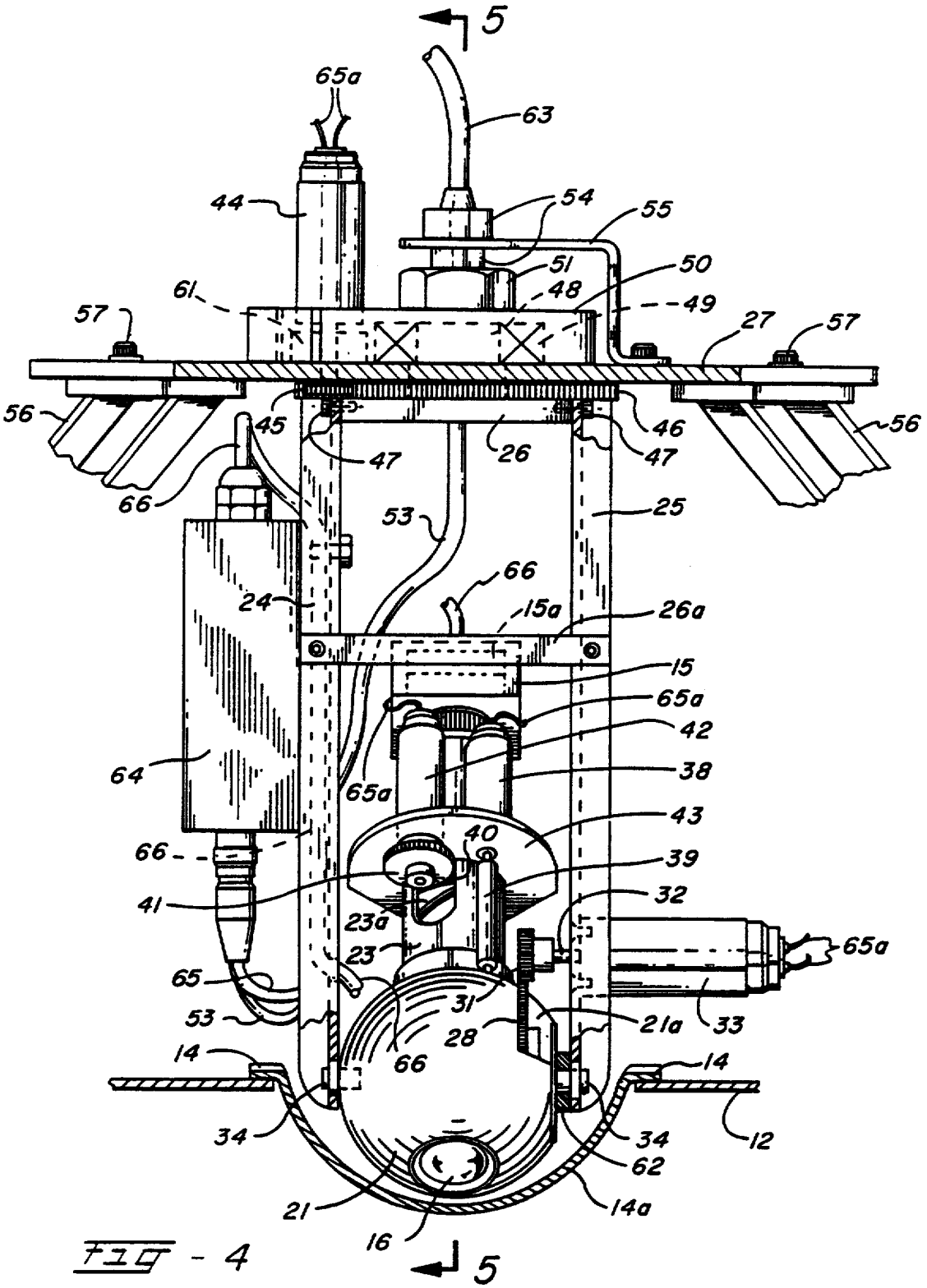

So that imaging assembly 10 can be tilted as desired under either manual or automatic robotic control from a remote position in the usual closed circuit television system (not shown) of which the device of the invention becomes a part, the body of such spherical mount is cut away or notched, as at 21a, to accommodate a sector gear 28, FIG. 4, and an arrangement for moving objective lens tube 22 up and down, see FIG. 5.

such gear 28 is securely fastened to spherical mount 21, as by screws 30, FIG. 1. A drive pinion 31 is affixed to the output shaft 32, FIG. 4, of a remotely controlled, miniature, reversible, electric motor 33, and is in mesh with sector gear 28 for rotating the spherical mount back and forth, depending upon the direction of rotation of motor 33, on stub shafts 34 that project into and are journaled in corresponding receiving openings, respectively, of arms 24 and 25 of mounting structure 11. Accordingly, tilting of imaging assembly 10 is controlled by electric motor 33.

The arrangement for moving objective lens tube 22 up and down comprises a bar 36, FIG. 5, fastened to objective lens tube 22 as by a screw 37, and into which bar the lower threaded end 38a of an output shaft 38 of a remotely controlled, miniature, reversible, electric motor 39 is threaded. Depending upon the direction of rotation of motor 39, objective lens 16 is moved either up or down relative to spherical mount 21.

For robotically adjusting the positions of zoom lenses 17a and 17b, their cam mounting 20, FIG. 5, has a spur gear 40 fastened thereto and exposed through an aperture 23a, FIG. 4, in barrel housing 23 for intermeshing with a drive pinion 41 that is affixed to the output shaft of a remotely controlled, miniature, reversible, electric motor 42. Such motor, as well as motor 38, is conveniently supported by a shelf 43 affixed to and projecting outwardly from barrel housing 23.

Panning of imaging assembly 10 and its objective lens 16 relative to dome fixture 14 is carried out through turntable 26 by remotely controlled, miniature, electric motor 44. The output shaft of such motor carries a drive pinion 45, FIG. 4, intermeshing with a spur gear 46 affixed to turntable 26 below platform 27. Arms 24 and 25 depend from securement at their upper ends to turntable 26, as by means of screws 47. The turntable is rotatably supported by platform 27 by means of a stepped shaft 48, see particularly FIG. 5, passing through the platform and having a portion of reduced diameter journaled in a bearing 49 that is press fit into a housing 50 on the platform. A nut 51 on the shaft 48 beyond housing 50 maintains turntable 26 in place. A passage 52 through turntable 26 and its shaft 48 provides for the running therethrough of a composite electric cable 53 from the lower, rotor end of a slip ring device 54 of well-known construction that permits repeated, full circle rotation of imaging assembly 10. Slip ring device 54 is held in place by a bracket 55. Bearing housing 50 is provided with a clamping arm 50a for holding electric motor 44 in place.

Mounting structure 11 comprises means for removably supporting platform 27 and its associated imaging assembly 10 on and above a ceiling, such as 12, however constructed, but usually one made up of accoustical tiles and lightweight runners on which they rest so that imaging assembly 10 can be readily moved from one dome fixture to another as found expedient from time to time. A dome fixture 14 may be inset into one of the accoustic tiles or, preferably, into a grill of relatively thin material customarily present. In any case, the support means preferably comprises a tripod arrangement adjustably fastened to platform 27. Thus, as best illustrated in FIG. 1, three tripod legs indicated 56, respectively, are fastened, as by means of bolts 57, to platform corners in adjustment slots 58. They are each height adjustable, as by means of a foot pad 59 having a steam 59a threaded into the bottom member 56a of the corresponding tripod leg.

For shutting off tilting motor 33 at opposite terminations of a tilting stroke, respective limit switches (not shown) are provided at the terminal locations for activation by appropriate members (not shown) extending from imaging assembly 10. As, in effect, parking brakes for imaging assembly panning and tilting movements, commercially available power-off brake mechanisms 61 and 62 of well-known type, e.g., units manufactured by Inertia Dynamics, Florida, are provided for activation coincidentally with shut-off of power to the respective motors.

Imaging assembly 10 and its mounting 11 are electrically interconnected with a standard type of receiver, control, and decoder box (not shown) of the previously mentioned closed circuit television system by a plug-in composite cable 63, FIG. 1, for supply of power, for transmission of control signals from the console of such television system, if manually operated, or from suitable circuitry if automatically operated, and for return to such television system of electronically processed video signals derived by image-acquisition device 15a, through respective electrical conductors of such cable. Cable 63 connects into the upper, stator end of slip ring device 54 and its respective conductors connect electrically with corresponding conductors of cable 53.

Electrical cable 53 supplies the electronic circuitry (not shown) in an electronic processing box 64 with power and control signals through respective conductors, while respective conductors 65a of a second electrical cable 65, FIG. 4, carry power and electronically processed control signals to the several electric motors 33, 38, 42, and 44. An electric cable 66 connects image-acquisition device 15a with the electronic camera circuitry in box 64, while respective conductors in cables 53 and 63 carry processed video signals back to the receiver, control, and decoder box of the television system.

As previously indicated, miniaturization of the imaging assembly of the invention is made possible by combining a known image-acquisition device, that has been previously used to a limited extent in video cameras of surveillance systems, with previously known microscope technology modified by suitably regrinding lenses of the lens system as dictated by the new use, modifications that are within the skill of a video optics technician.

Maximum scanning sweep, by the miniaturized imaging assembly, of an area to be watched is made possible by the forward pivoting of the objective lens mount of the imaging assembly for positioning substantially at the concavity of an unusually small dome of a dome fixture. A spherical mount for the objective lens also provides a surface that minimizes tell-tale light reflection through the dome. By blackening the spherical surface of the spherical mount, as by anodizing when such spherical mount is made of aluminum, light reflection is further minimized, if not prevented altogether.

Although it is preferred to utilize a known type of electrically conductive slip ring device 54, which is commercially available (e.g. as produced by Litton Polyscientific) for enabling continuous and unlimited panning rotation of imaging assembly 10, a mounting plate provided with a spiral groove and limit switches at opposite ends of the groove, respectively, for stopping and reversing the panning drive motor at the respective terminations of the spirit track, has been used successfully. Such a non-continuous device could be utilized in place of slip ring device 54 if found advantageous in any instance.

Typical specifications of the illustrated embodiment (well understood by those familiar with the art) are as follows:

| ANGULAR TRAVEL: | PAN-CONTINOUS |
|---|---|
| Speed: | Tilt-0 to 80 deg.<br>Pan-80 deg./sec<br>Tilt-30 deg./sec |
| Braking and Parking | +5 deg. |
| Environmental: | Indoor-Outdoor Dome Fixtures |
| Optical Specifications: | |
| Imager | ⅔" Interline transfer CCD<br>Pixel-510 (H) × 492 (V) high resolution Imager |
| Scanning: | 525 lines, 60 Hz, interlace |
| Video Output: | 1.0 V p—p, Sync Negative, 75 ohm |
| Minimum Illumination: | 2.0 Lux at F. = 1.4 |
| TV Line Resolution: | 370 H, 250 V |
| AGC, Gamma. | AGC ON, GAMMA = 0.45 |
| External Sync: | accepts VD, HD sync. |
| Lens: | Focal length-12 mm to 76 mm<br>Field of View<br>Hi Mag 4.6 deg. × 6.2 deg.<br>Lo Mag 30 deg. |
| Zoom Assembly: | 7.5 to 1 zoom power |
| Weight: | Approx. 10 lbs |
| Input Voltage: | 115 VAC, 60 Hz |
| Power Consumption: | Transmitter-2.5 VA<br>Receiver-115 VAC; 5 VA<br>Pan/Tilt Supply-115 VAC<br>140 VA Max.; 6 VDC: 50 VA<br>Lens supply-0-4 VA Max<br>Camera supply-15 VA |
| Control Method: | 15-pulse train (pulse width modulated) superimposed on the video signal during the vertical interval by the Control Transmitter. Pulse train occupies 1 TV line period. |
| Pulse Amplitude: | Approx. 1 V p—p added to video signal, 333 KHZ nom. |
| Connectors: | Control Transmitter-3 BNC connectors.<br>Receiver-video input and output BNC.<br>Control output, AMP Series CPC |
| Input Video Level: | 1 V p—p nominal: 2 V p—p at less than 75% APL; 1.5 V p—p max at 90% APL |
| System Bandwidth: | Less than 2 db down at 10 MHZ |
| Power Cord: | 3-wire grounded No. 18 AWG, TRA/REC |
| Ambient Temp: | −40 DEG. F. to + 140 DEG. F. |

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow:

We claim:

1. An integrated imaging assembly and mounting therefor particularly for surveillance viewing under remote control from a closed circuit television system, said imaging assembly comprising an optical lens arrangement including, among other lenses, an objective lens, a mount for said objective lens, and an electronic, charge-coupled, image-acquisition device optically aligned with said lens arrangement for receiving images therefrom; mounting means for said imaging assembly; means pivotally mounting said objective lens mount in said mounting means rearwardly of but adjacent to said objective lens, so the objective lens and the forward portion of said objective lens mount can be placed within a concave viewing dome of unusually small and shallow size, with the remainder of said imaging assembly and mounting therefor substantially wholly outside of and behind the concavity of the viewing dome, and can be tilted and panned to sweep over a broad viewing area with minimum protrusion thereinto, *wherein the viewing done is unusually small when the viewing dome has a diameter of less than twelve inches*; remotely controlled means for panning said objective lens mount; remotely controlled means for adjusting the positions of lenses in said lens arrangement; and electronic video camera means with which said charge-coupled, image-acquisition device is electrically connected.

2. An integrated imaging assembly and mounting therefor according to claim 1, wherein the objective lens and the other lenses of the lens arrangement are of microscopic type that are miniature relative to the lenses of a standard video surveillance system.

3. An integrated imaging assembly and mounting therefor according to claim 2, wherein the remotely controlled means for adjusting the positions of lenses in the lens arrangement comprises remotely controlled, miniature, electric motors for respective lenses; and drive means between said motors and the respective lenses.

4. An integrated imaging assembly and mounting therefor particularly for surveillance viewing under remote control from a closed circuit television system, said imaging assembly comprising an optical lens arrangement including, among other lenses, an objective lens, a mount for said objective lens, an an electronic, charge-coupled, image-acquisition device optically aligned with said lens arrangement for recieving images therefrom; mounting means for said imaging assembly; means pivotally mounting said objective lens mount in said mounting means rearwardly of but adjacent to said objective lens, so the forward end of said objective lens mount can be placed within a concave viewing dome of unusually small and shallow size, with the remainder of said imaging assembly outside of and behind the concavity of the viewing dome, and can be tilted and panned to sweep over a broad viewing area with minimum protrusion thereinto; remotely controlled means for tilting said objective lens mount; remotely controlled mens for panning said objective lens mount; remotely controlled means for adjusting the positions of lenses in said lens arrangement; and electronic video camera means with which said image-acquisition, charge-coupled device is electrically connected, the mount for the objective lens being spherical in shape and pivoted on an axis extending transversely of and normal to the optical axis of said objective lens.

5. An integrated imaging assembly and mounting therefor according to claim 4, wherein the spherical mount for the objective lens has a black, outer, spherical surface.

6. An integrated imaging assembly and mounting therefor according to claim4, wherein the remotely controlled means for tilting the objective lens mount comprises a sector gear fastened to said mount internally of its spherical shape; a drive pinion n mesh with said sector gear; and a miniature, reversible, electric motor for rotating said drive pinion in opposite directions.

7. An integrated imaging assembly and mounting therefor particularly for surveillance viewing under remote control from a closed circuit television system, said imaging assembly comprising an optical lens arrangement including, among other lenses, an objective lens, a mount for said objective lens, and an electronic, charge-coupled, image-acquisition device optically aligned with said lens arrangement for receiving images therefrom; mounting means for said imaging assembly; means pivotally mounting said objective lens mount in said mounting means rearwardly of but adjacent to said objective lens, so the forward end of said objective lens mount can be placed within a concave viewing dome of unusually small and shallow size, with the remainder of said imaging assembly outside of and behind the concavity of the viewing dome, and can be tilted and panned to sweep over a broad viewing area with minimum protrusion thereinto, *wherein the viewing done is unusually small when the viewing dome has a diameter of less than twelve inches*; remotely controlled means for tilting said objective lens mount; remotely controlled means for panning said objective lens mount; remotely controlled means for adjusting the positions of lenses in said lens arrangement; and electronic video camera means with which said image-acquisition, charge-coupled device is electrically connected, the imaging assembly mounting means comprising a turntable; mounting means for said turntable; and a pair of arms depending from said turntable, the objective lens mount being pivotally mounted in and between the lower ends of the arms of said pair; the remotely controlled means for panning the objective lens mount comprising a remotely controlled, miniature, electric motor; and drive means between said electric motor and said turntable.

8. An integrated imaging assembly and mounting therefor according to claim 7, wherein the components of the imaging assembly are physically aligned longitudinally of and between the arms of the pair and are rigidly interconnected so as to tilt with the objective lens mount relative to said arms.

9. An integrated imaging assembly and mounting therefor according to claim 8, wherein the electronic camera means is mounted on one of the arms of the pair; wherein electric cable means adapted for connection into a closed circuit television system passes into the imaging assembly through the turntable and is connected with the electronic camera means and the motor means; and wherein means are provided adjacent to said turntable for preventing said cable from undue twisting.

10. An integrated imaging assembly and mounting therefor according to claim 9, wherein the means provided to prevent undue twisting of the cable is a slip ring.

11. An integrated imaging assembly and mounting therefor according to claim 7, wherein the mounting means for the turntable comprises a platform in which the turntable is mounted, and a plurality of legs depending from said platform to terminations in feet adapted to rest on a supporting surface about at the pivoting level of the objective lens mount.

12. An integrated imaging assembly and mounting therefor according to claim 11, wherein the feet are height adjustably attached to the lower ends of the legs.

13. An integrated imaging assembly and mounting therefor according to claim 12, wherein the positions of the legs are laterally adjustable relative to the *platform*.

14. An integrated imaging assembly and mounting therefor according to claim 7, including electrically-operated parking brake means for holding the objective lens mounting and the turntable, respectively, in position upon de-energization of their motor means.

15. An integrated imaging assembly and mounting therefor according to claim 7, wherein the objective lens and the other lenses of the lens arrangement are of microscopic type that are miniature relative to the lenses of a standard video surveillance camera.

16. An integrated imaging assembly and mounting therefor according to claim 15, wherein the remotely controlled means for adjusting the positions of lenses in the lens arrangement comprises remotely controlled, miniature, electric motors for respective lenses; and drive means between said motors and the respective lenses.

17. An integrated imaging assembly and mounting therefor according to claim 15, wherein the mount for the objective lens is spherical in shape and is pivoted on an axis extending transversely of and normal to the optical axis of said objective lens.

18. An integrated imaging assembly and mounting therefor according to claim 17, wherein the spherical mount for the objective lens has a black, outer, spherical surface.

19. An integrated imaging assembly and mounting therefor according to claim 17, wherein the remotely controlled means for tilting the objective lens mount comprises a sector gear fastened to said mount internally of its spherical shape; a drive pinion in mesh with said sector gear; and a miniature, reversible, electric motor for rotating said drive pinion in opposite directions.

20. An inconspicuous but broad sweep surveillance video viewing installation, comprising a concave viewing dome of unusually small size and shallow depth positioned for broad sweep viewing with its concavity facing upwardly, *wherein the viewing dome is unusually small when the viewing dome has a diameter of less than twelve inches*; an integrated imaging assembly and mounting therefor adapted for interconnection with a closed circuit television system, said imaging assembly comprising an optical lens arrangement including, among other lenses, an objective lens, a mount for said objective lens, and an electronic, charge-coupled, image-acquisition device optically aligned with said lens arrangement for receiving images therefrom; mounting means for said imaging assembly positioned above and substantially wholly outside the concavity of said dome; means pivotally mounting said objective lens mount in said mounting means rearwardly of but adjacent to said objective lens at about the level of the opening of the concavity of the dome, so the objective lens and forward portion of said objective lens mount is within said dome, with the remainder of said imaging assembly and mounting therefor substantially wholly outside of and behind the concavity of the dome, and can be tilted and panned to sweep over a broad viewing area with minimum protrusion thereinto; remotely controlled means for tilting said objective lens mount; remotely controlled means for panning said objective lens mount; remotely controlled means for adjusting the positions of lenses in said lens arrangement; and electronic video camera means with which said image-acquisition, charge-coupled device is electrically connected.

21. A surveillance video viewing installation according to claim 20, wherein the objective lens and the other lenses of the lens arrangement are of microscope type that are miniature relative to the lenses of a standard video surveillance system.

22. A surveillance video viewing installation according to claim 21, wherein the remotely controlled means for adjusting the positions of lenses in the lens arrangement comprises remotely controlled, miniature, electric motors for respective lenses; and drive means between said motors and the respective lenses.

23. A surveillance video viewing installation according to claim 20, wherein the mount for the objective lens is spherical in shape and is pivoted on an axis extending transversely of and normal to the optical axis of said objective lens.

24. A surveillance video viewing installation according to claim 23, wherein the spherical mount for the objective lens has a black, outer, spherical surface.

25. A surveillance video viewing installation according to claim 23,wherein the remotely controlled means for tilting the objective lens mount comprises a sector gear fastened to said mount internally of its spherical shape; a drive pinion in mesh with said sector gear; and a miniature, reversible, electric motor for rotating said drive pinion in opposite directions.

26. A surveillance video viewing installation according to claim 20, wherein the imaging assembly mounting means comprises a turntable; mounting means for said turntable; and a pair of arms depending from said turntable, the objective lens mount being pivotally mounted in and between the lower ends of the arms of said pair; and wherein the remotely controlled means for panning the objective lens mount comprises a remotely controlled, miniature, electric motor; and drive means between said electric motor and said turntable.

27. A surveillance video viewing installation according to claim 26, wherein the components of the imaging assembly are physically aligned longitudinally of and between the arms of the pair and are rigidly interconnected so as to tilt with the objective lens mount relative to said arms.

28. A surveillance video viewing installation according to claim 27, wherein the electronic camera mans is mounted on one of the arms of the pair; wherein electric cable means adapted for connection into a closed circuit television system passes into the imaging assembly through the turntable and is connected with the electronic camera means and the motor means; and wherein means are provided adjacent to said turntable for preventing said cable from undue twisting.

29. A surveillance video viewing installation according to claim 28, wherein the means provided to prevent undue twisting of the cable is a slip ring device.

30. A surveillance video viewing installation according to claim 26, wherein the mounting means for the turntable comprises a platform in which the turntable is mounted, and a plurality of legs depending from said platform to terminations in feet adapted to rest on a supporting surface about at the pivoting level of the objective lens mount.

31. A surveillance video viewing installation according to claim 30, wherein the feet are height adjustably attached to the lower ends of the legs.

32. A surveillance video viewing installation according to claim 31, wherein the positions of the legs are laterally adjustable relative to the platform.

33. A surveillance video viewing installation according to claim 26, including electrically operated parking brake means for holding the objective lens mounting and the turntable, respectively, in position upon de-energization of their motor means.

34. A surveillance video viewing according to claim 26, wherein the objective lens and the other lenses of the lens arrangement are of microscope type that are miniature relative to the lenses of a standard video surveillance system.

35. A surveillance video viewing installation according to claim 34, wherein the remotely controlled means for adjusting the positions of lenses in the lens arrangement comprises remotely controlled, miniature, electric motors for respective lenses; and drive means between said motors and the respective lens.

36. A surveillance video viewing installation according to claim 34, wherein the mount for the objective lens is spherical in shape and is pivoted on an axis extending transversely of and normal to the optical axis of said objective lens.

37. A surveillance video viewing installation according to claim 36, wherein the spherical mount for the objective lens has a black, outer, spherical surface.

38. A surveillance video viewing installation according to claim 36, wherein the remotely controlled means for tilting the objective lens mount comprises a sector gear fastened to said mount internally of its spherical shape; a drive pinion in mesh with said sector gear; and a miniature, reversible, electric motor for rotating said drive pinion in opposite directions.

*39. A surveillance device for visual monitoring of a viewing area, said surveillance device comprising:*

*(a) an objective lens;*

*(b) an image-acquisition device optically aligned with said objective lens, said image-acquisition device being capable of receiving an image of the viewing area secured through said objective lens along a predetermined viewing direction and converting said image into signals processable into video signals;*

*(c) a mounting structure supporting said objective lens and said image-acquisition device with said objective lens protruding into the viewing area; and*

*(d) objective lens orientation means for pivoting said objective lens and said image-acquisition device from said mounting structure about an associated pivot point located rearwardly of and adjacent to said objective lens, thereby to vary said predetermined viewing direction.*

*40. A surveillance device as recited in claim 39, further comprising covert viewing enhancement means secured to said objective lens and being pivotable therewith for reducing the reflection from said surveillance device of light from the viewing area, thereby to reduce the ability of an observer in the viewing area to ascertain said predetermined viewing direction.*

*41. A surveillance device as recited in claim 40, wherein said covert viewing enhancement means comprises a spherical shield secured concentrically about the optical axis of said objective lens.*

*42. A surveillance device as recited in claim 41, wherein said spherical shield is disposed in a substantially concentric relationship to said pivot point of said objective lens orientation means.*

*43. A surveillance device as recited in claim 39, wherein said image-acquisition device remains outside of the viewing area in said predetermined viewing directions.*

*44. A surveillance device as recited in claim 39, wherein said viewing area is bounded by surfaces defining a viewing area enclosure, and wherein said image-acquisition device remains outside of the viewing area for any said predetermined viewing direction oriented normal to said enclosure at the location on a surface thereof at which said surveillance device is installed.*

*45. A surveillance device for visual monitoring of a viewing area, said surveillance device comprising:*

*(a) a mounting structure;*

*(b) an objective lens;*

*(c) a substantially spherical objective lens mount, said objective lens being secured in a surface of said lens mount to permit outward viewing through said objective lens along a preselected viewing directions, said lens mount being upheld from said mounting structure for pivotable movement on a tilting axis disposed normal to the optical axis of said objective lens at a point on said optical axis located to the rear of said objective lens.*

*46. A surveillance device as recited in claim 45, wherein said objective lens mount is pivotable relative to said mounting structure for panning movement about a panning axis disposed normal to said tilting axis.*

*47. A surveillance device as recited in claim 46, wherein said panning axis intersects said tilting axis.*

*48. A surveillance device as recited in claim 45, wherein the viewing area is bounded by a plurality of surfaces defining a viewing area enclosure, and wherein said tilting axis is disposed parallel and proximate to a surface of the viewing area at a preselected installation location for said surveillance device.*

*49. A surveillance device for visual monitoring of a viewing area, the viewing area being bounded by a plurality of surfaces defining a viewing area enclosure through which a viewing aperture is formed at a preselected installation location, said surveillance device comprising:*

*(a) a viewing dome securable inside the viewing area against a surface of the enclosure covering the viewing aperture;*

*(b) an objective lens;*

*(c) an image-acquisition device in optical alignment with said objective lens;*

*(d) a mounting structure supporting said objective lens and image-acquisition device, said mounting structure being positioned at the installation site outside of said viewing area with said objective lens protruding through said viewing aperture into the space within said viewing dome; and*

*(e) objective lens orientation means for pivoting said objective lens and said image-acquisition device from said mounting structure about an associated pivot point located proximate to a surface of the viewing area enclosure at the viewing aperture.*

*50. A surveillance device as recited in claim 49, further comprising a substantially spherical shield having said objective lens secured in a surface thereof and being disposed at least partially in said viewing dome, thereby to block visual access from the viewing area through said viewing aperture.*

*51. A surveillance device for visual monitoring of a viewing area, the viewing area being bounded by surfaces defining a viewing area enclosure, said surveillance device comprising:*

*(a) means for viewing into the viewing area along a preselected viewing direction and for presenting an image of the viewing area along said preselected viewing direction, said means for viewing having a free end proximate to the viewing area;*

*(b) an image-acquisition device mounted at the end of said means for viewing opposite said free end thereof, said image-acquisition device being in optical alignment with said means for viewing and being capable of*

*receiving said image of the viewing area and converting said image into signals processable into video signals;*

*(c) support means for upholding said means for viewing and said image-acquisition device at a preselected installation location on a surface of the viewing area enclosure with said free end of said means for viewing projecting into the viewing area; and*

*(d) objective lens orientation means for pivoting said means for viewing and said image-acquisition device from said support means about a pivot point located between said free end of said means for viewing and said image-acquisition device.*

*52. A surveillance device as recited in claim 51, wherein said means for viewing comprises an objective lens located at said free end of said means for viewing.*

*53. A surveillance device as recited in claim 52, wherein said pivot point of said objective lens orientation means is located on the optical axis of said objective lens.*

*54. A surveillance device as recited in claim 52, further comprising means for reducing the reflection from said surveillance device of light from said means for viewing, thereby to reduce the ability of an observer in the viewing area to ascertain said predetermined viewing direction.*

*55. A surveillance device as recited in claim 54, wherein said means for reducing reflection comprises a spherical shield secured about said objective lens in a substantially concentric relationship to said pivot point of said objective lens orientation means.*

*56. A surveillance device as recited in claim 51, wherein said objective lens orientation means is disposed substantially wholly outside of the viewing area, and said means for viewing is pivoted by said objective lens orientation means for movement on a tilting axis disposed parallel and proximate to a surface of the viewing area at a preselected installation location for said surveillance device.*

*57. A surveillance device as recited in claim 51, further comprising a video processing device secured to said objective lens orientation means at a position separate from said image-acquisition device, said video processing device being capable of receiving said signals from said image-acquisition device.*

*58. A surveillance device as recited in claim 51, wherein said objective lens orientation means comprises:*

*(a) a turntable rotatably secured to said support means capable of rotation relative thereto about a panning axis;*

*(b) a remotely controlled panning motor operably connected between said turntable and said support means;*

*(c) an objective lens support arm projecting from said turntable toward said viewing area, said objective lens being tiltably mounted at the end of said objective lens support arm remote from said turntable for pivotable movement about a tilting axis disposed normal to the optical axis of said objective lens at a point on said optical axis located to the rear of said objective lens; and*

*(d) a remotely controlled tilting motor operably connected between said objective lens support arm and said objective lens.*

*59. A surveillance device for visual monitoring of a viewing area, said device comprising:*

*(a) an objective lens;*

*(b) an image-acquisition device optically aligned with said objective lens, said image-acquisition device being capable of receiving an image of the viewing area secured through said objective lens along a predetermined line of vision and converting said image into signals processable into video signals;*

*(c) a mounting structure supporting said objective lens with said objective lens protruding into the viewing area;*

*(d) a turntable rotatably secured to said mounting structure pivotable relative thereto about a panning axis;*

*(e) a remotely controlled panning motor operably connected between said turntable and said mounting structure;*

*(f) a cable coupled electrically between said image-acquisition device and the outside of the surveillance device; and*

*(g) signal transfer means connected to said turntable for preventing undue twisting of said cable during repeated full-circle rotation of said mounting structure.*

*60. A surveillance device as recited in claim 59, wherein said signal transfer means comprises a slip ring interposed in said cable at said turntable, said slip ring being capable of transferring signals between portions of said cable on opposite sides of said slip ring during repeated full-circle rotation of said turntable without twisting of said cable.*

*61. A surveillance device for visual monitoring of a viewing area, said device comprising:*

*(a) an objective lens;*

*(b) an image-acquisition device optically aligned with said objective lens, said image-acquisition device being capable of receiving an image of the viewing area secured through said objective lens along a predetermined line of vision and converting said image into signals processable into video signals;*

*(c) a mounting structure supporting said objective lens with said objective lens protruding into the viewing area;*

*(d) a turntable rotatably secured to said mounting structure pivotable relative thereto about a panning axis;*

*(e) a remotely controlled panning motor operably connected between said turntable and said mounting structure; and*

*(f) pan parking brake means for fixing the relative position of said turntable and said mounting structure upon de-energization of said panning motor.*

*62. A surveillance device as recited in claim 61, wherein said first parking brake means comprises a power-off brake mechanism cable of being activated coincidentally with the de-energization of said panning motor.*

*63. A surveillance device for visual monitoring of a viewing area, said device comprising:*

*(a) an objective lens;*

*(b) an image-acquisition device optically aligned with said objective lens, said image-acquisition device being capable of receiving an image of the viewing area secured through said objective lens along a predetermined line of vision and converting said image into signals processable into video signals;*

*(c) a mounting structure supporting said objective lens with said objective lens protruding into the viewing area;*

*(d) an objective lens support arm supported by said mounting structure projecting toward said viewing area; and*

*(e) a remotely controlled tilting motor operably connected between said objective lens support arm and said objective lens; and*

*(f) tilt parking brake means for fixing the relative position of said objective lens and said objective lens support arm upon de-energization of said tilting motor.*

*64. A surveillance device as recited in claim 63, wherein said tilt parking brake means comprises a power-off brake mechanism capable of being activated coincidentally with the de-energization of said tilting motor.*

*65. A surveillance device for visually monitoring of a viewing area, the viewing area being bounded by a plurality of surfaces defining a viewing area enclosure with a preselected installation location for the surveillance device on one of the surfaces, said surveillance device comprising:*

*(a) an objective lens;*

*(b) an image-acquisition device optically aligned with said objective lens, said image-acquisition device being capable of receiving an image of the viewing area secured through said objective lens along a predetermined line of vision and converting said image into signals processible into video signals;*

*(c) a mounting structure supporting said objective lens and said image-acquisition device;*

*(d) an objective lens support arm projecting from said mounting structure toward said viewing area, said objective lens being tiltably mounted at the end of said objective lens support arm remote from said mounting structure with said objective lens protruding into the viewing area for pivoting movement about a tilting axis disposed parallel and proximate to a surface of the viewing area enclosure at the preselected installation location.*

*66. A surveillance device as recited in claim 65, wherein said mounting structure and said objective lens support arm are substantially wholly located on the side of the viewing area enclosure opposite from the viewing area.*

*67. A surveillance device as recited in claim 66, further comprising a viewing dome of unusually small and shallow size securable inside the viewing area against the surface of the enclosure covering the viewing aperture, wherein the viewing dome is unusually small when the viewing dome has a diameter of less than twelve inches.*

*68. A surveillance device for visual monitoring of a viewing area, the viewing area being bounded by surfaces defining a viewing area enclosure, said surveillance device comprising:*

*(a) means for viewing into the viewing area along a preselected viewing direction and for presenting an image of the viewing area along said preselected viewing direction, said means for viewing having a free end proximate to said viewing area and an objective lens located at said free end thereof;*

*(b) support means for upholding said means for viewing at a preselected installation location on a surface of the viewing area enclosure with said objective lens projecting into the viewing area; and*

*(c) objective lens orientation means for pivoting said means for viewing, said support means and said objective lens orientation means being located substantially wholly on the side of the viewing area enclosure opposite from the viewing area.*

*69. A surveillance device for visual monitoring of a viewing area, said surveillance device comprising:*

*(a) an objective lens;*

*(b) an image-acquisition device optically aligned with said objective lens, said image-acquisition device being capable of receiving an image of the viewing area secured through said objective lens along a predetermined viewing direction and converting said image being signals processible into video signals;*

*(c) a mounting structure supported said objective lens and said image-acquisition device with said objective lens protruding into the viewing area;*

*(d) a turntable rotatably secured to said mounting structure capable of rotation relative thereto about a panning axis;*

*(e) a remotely controlled panning motor operably connected between said turntable and said mounting structure;*

*(f) an objective lens support arm projecting from said turntable toward said viewing area, said objective lens being tiltably mounted at the end of said objective lens support arm remote from said turntable for pivoting movement about a tilting axis disposed normal to the optical axis of said objective lens at a point on said optical axis located to the rear of said objective lens; and*

*(g) a remotely controlled tilting motor operably connected between said objective lens support arm and said objective lens.*

*70. A surveillance device as recited in claim 69, wherein the viewing area is bounded by a plurality of surfaces defining a viewing area enclosure, and wherein said tilting axis is disposed parallel and adjacent to a surface of the viewing area enclosure at a preselected installation location for said surveillance device.*

*71. A surveillance device for visual monitoring of a viewing area, said surveillance device comprising:*

*(a) an objective lens;*

*(b) an image-acquisition device optically aligned with said objective lens, said image-acquisition device being capable of receiving an image of the viewing area secured through said objective lens along a predetermined viewing direction and converting said image into electrical signals processible into video signals;*

*(c) a mounting structure supporting said objective lens and said image-acquisition device with said objective lens protruding into the viewing area, said mounting structure comprising:*

*(i) a platform; and*

*(ii) means for supporting said platform in a fixed relationship to the viewing area;*

*(d) a turntable rotatably secured to said platform for rotational movement relative thereto about a pannings axis;*

*(e) first and second parallel objective lens support arms projecting from said turntable toward said viewing area, each of said support arms having a free end remote from said turntable; and*

*(f) means for tiltably supporting said objective lens and said image-acquisition device between said free ends of said first and second support arms for tilting movement about a tilting axis disposed rearwardly of and adjacent to said objective lens.*

*72. A surveillance device for visual monitoring of a viewing area, said surveillance device comprising:*

*(a) a viewing dome of small diameter, wherein the viewing dome has a small diameter when the viewing dome has a diameter of less than twelve inches;*

*(b) an objective lens;*

*(c) an image-acquisition device optically aligned with said objective lens, said image-acquisition device being capable of receiving an image of the viewing area secured through said objective lens along a predetermined viewing direction and converting said image into electrical signals processible into video signals;*

*(d) a mounting structure supporting said objective lens and said image-acquisition device with said objective lens protruding into the concavity of said viewing dome, said mounting structure comprising:*

*(i) a platform; and*

(ii) means for supporting said platform in a fixed relationship to the viewing area;

(e) a turntable rotatably secured to said platform for rotational movement relative thereto about a panning axis;

(f) first and second parallel objective lens support arms projecting from said turntable toward said viewing area, each of said support arms having a free end remote from said turntable; and (g) means for tiltably supporting said objective lens and said image-acquisition device between said free ends of said support arms in tilting movement about a tilting axis.

73. A surveillance device as recited in claim 72, wherein said tilting axis is disposed between said objective lens and said image-acquisition device at a point no closer to said image-acquisition device than to said objective lens.

74. A surveillance device as recited in claim 72, wherein said tilting axis is disposed between said objective lens and said image-acquisition device at a point closer to said objective lens than to said image-acquisition device.

75. A surveillance device for visual monitoring of a viewing area, said surveillance device comprising:

(a) a viewing dome having a diameter of less than twelve inches;

(b) an objective lens;

(c) an image-acquisition device optically aligned with said objective lens, image-acquisition device being capable of receiving an image of the viewing area secured through said objective lens along a predetermined viewing direction and converting said image into electrical signals processible into video signals;

(d) a mounting structure supporting said objective lens and said image-acquisition device with said objective lens protruding into the concavity of said viewing dome, said mounting structure comprising:

(i) a platform; and (ii) means for supporting said platform in a fixed relationship to the viewing area;

(e) a turntable rotatably secured to said platform for rotational movement relative thereto about a panning axis;

(f) first and second parallel objective lens support arms projecting from said turntable toward said viewing area, each of said support arms having a free end remote from said turntable; and (g) means for tiltably supporting said objective lens and said image-acquisition device between said free ends of said support arms in tilting movement about a tilting axis.

76. A surveillance device as recited in claim 75, wherein said tilting axis is disposed between said objective lens and said image-acquisition device at a point no closer to said image-acquisition device than to said objective lens.

77. A surveillance device as recited in claim 75, wherein said tilting axis is disposed between said objective lens and said image-acquisition device at a point closer to said objective lens than to said image-acquisition device.

78. A surveillance device for visual monitoring of a viewing area, said surveillance device comprising:

(a) an objective lens;

(b) an image-acquisition device optically aligned with said objective lens, said image-acquisition device being capable of receiving an image of the viewing area secured through said objective lens along predetermined viewing direction and converting said image into electrical signals processible into video signals;

(c) a mounting structure supporting said objective lens and said image-acquisition device with said objective lens protruding into the viewing area said mounting structure comprising:

(i) a platform; and (ii) means for supporting said platform in a fixed relationship to the viewing area;

(d) an objective lens orientation means for pivotally supporting said objective lens and said image-acquisition device from said platform for pivotable movement about a pivot point located between said objective lens and said image-acquisition device at a point no closer to said image-acquisition device than to said objective lens, said objective lens orientation means comprising:

(i) a turntable rotatably secured to said platform for rotational movement relative thereto about a panning axis;

(ii) first and second parallel objective lens support arms projecting from said turntable toward said viewing area, each of said support arms having a free end remote from said turntable; and (iii) a pair of pivot pins, one of said pivot pins secured to the free end of each of said lens support arms, thereby to tiltably support said objective lens and said image-acquisition device between said free ends of said objective lens support arms for tilting movement about a tilting axis defined by said pivot pins.

79. A surveillance device as recited in claim 78, wherein said tilting axis is disposed between said objective lens and said image-acquisition device at a point closer to said objective lens than to said image-acquisition device.

80. A surveillance device as recited in claim 78, further comprising a signal processing box separated from said image-acquisition device and mounted on said objective lens orientation means, said signal processing box being electrically coupled to said image-acquisition device, thereby to receive said electrical signals therefrom.

81. A surveillance device as recited in claim 78, further comprising a slip ring in said turntable, said slip ring being capable of transferring electrical signals between opposite sides of said turntable during repeated full-circle rotation thereof.

82. A surveillance device for visual monitoring of a viewing area, said surveillance device comprising:

(a) an objective lens;

(b) an image-acquisition device optically aligned with said objective lens, said image-acquisition device being capable of receiving an image of the viewing area secured through said objective lens along a predetermined viewing direction and converting said image into electrical signals processible into video signals;

(c) mounting means for supporting said objective lens and said image-acquisition device with at least said objective lens protruding into the viewing area;

(d) panning means secured to said mounting means for rotating said objective lens about a panning access;

(e) first and second parallel objective lens support arms projecting from said panning means towards said viewing area; and (f) means for tiltably supporting said objective lens and said image-acquisition device between said support arms for tilting movement about a tilting axis disposed between said objective lens and said image-acquisition device at a point no closer to said image-acquisition device than to said objective lens.

83. A surveillance device as recited in claim 82, wherein said tilting axis is disposed between said objective lens and

*said image-acquisition device at a point closer to said objective lens than to said image-acquisition device.*

*84. A surveillance device as recited in claim 51, wherein said tilting axis is disposed between said objective lens and said image-acquisition device at a point no closer to said image-acquisition device than to said objective lens.*

*85. A surveillance device as recited in claim 51, wherein said tilting axis is disposed between said objective lens and said image-acquisition device at a point closer to said objective lens than to said image-acquisition device.*

* * * * *

UNITED STATES PATENT AND TRADEMARK OFFICE

CERTIFICATE OF CORRECTION

PATENT NO. : Re. 34,989

DATED : July 4, 1995

INVENTOR(S) : KENNETH E. STRUHS et al.

It is certified that error appears in the above-indentified patent and that said Letters Patent is hereby corrected as shown below:

On title page, item [56]

Page 2, column 2 of "Other Publications," line 35, "Pelso" should be --Pelco--

Column 7, line 33, "an an electronic" should be --and an electronic--

Column 7, line 60, "claim4" should be --claim 4--
Column 7, line 63, "n mesh" should be --in mesh--
Column 10, line 39, "mans" should be --means--

Column 14, line 44, "first" should be --pan--
Column 16, line 41, "pannings" should be --panning--

Signed and Sealed this

Seventh Day of November, 1995

*Attest:*

Bruce Lehman

BRUCE LEHMAN

*Attesting Officer*

*Commissioner of Patents and Trademarks*